US008782401B2

(12) United States Patent
Sarangdhar et al.

(10) Patent No.: US 8,782,401 B2
(45) Date of Patent: Jul. 15, 2014

(54) ENHANCED PRIVACY ID BASED PLATFORM ATTESTATION

(71) Applicants: Nitin V Sarangdhar, Portland, OR (US); Daniel Nemiroff, Folsom, CA (US)

(72) Inventors: Nitin V Sarangdhar, Portland, OR (US); Daniel Nemiroff, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 99 days.

(21) Appl. No.: 13/627,784

(22) Filed: Sep. 26, 2012

(65) Prior Publication Data

US 2014/0089660 A1 Mar. 27, 2014

(51) Int. Cl.
*H04L 29/06* (2006.01)
*H04L 9/32* (2006.01)

(52) U.S. Cl.
CPC .................................... *H04L 9/3234* (2013.01)
USPC .............................. 713/156; 380/44; 380/277

(58) Field of Classification Search
CPC ..................................................... H04L 9/3234
See application file for complete search history.

(56) References Cited

U.S. PATENT DOCUMENTS

| | | | | |
|---|---|---|---|---|
| 8,566,606 | B2 * | 10/2013 | Movva et al. | 713/187 |
| 2005/0283601 | A1 * | 12/2005 | Tahan | 713/2 |
| 2009/0271618 | A1 | 10/2009 | Camenisch et al. | |
| 2012/0173877 | A1 * | 7/2012 | Pendakur et al. | 713/169 |

OTHER PUBLICATIONS

Brickell, et al., "Enhanced Privacy ID from Bilinear Pairing", last accessed via internet on Jan. 31, 2013, website: eprint.iacr.org/2009/095.pdf, (2009), pp. 1-23.

Brickell, et al., "Enhanced Privacy ID from Bilinear Pairing for Hardware Authentication and Attestation,", IEEE International Conference on Social Computing/IEEE International Conference on Privacy, Security, Risk and Trust; IEEE Computer Society, pp. 768-775, 2010 IEEE, (2010), pp. 768-775.

* cited by examiner

*Primary Examiner* — Pramila Parthasarathy
(74) *Attorney, Agent, or Firm* — Blakely, Sokoloff, Taylor & Zafman LLP

(57) ABSTRACT

As opposed to utilizing a manufacturer provisioned EK Certificate for AIK processes, embodiments of the invention utilize EPID based data. EPID mitigates the privacy issues of common RSA PKI security implementations where every individual is uniquely identified by their private keys. Instead, EPID provides the capability of remote attestation but only identifies the client computing system as having a component (such as a chipset) from a particular technology generation. EPID is a group signature scheme, where one group's public key corresponds to multiple private keys, and private keys generate a group signature which is verified by the group public key. EPID provides the security property of being anonymous and unlinkable—given two signatures, one cannot determine whether the signatures are generated from one or two private keys. EPID also provides the security property of being unforgeable—without a private key, one cannot create a valid signature.

15 Claims, 6 Drawing Sheets

ENHANCED PRIVACY ID BASED PLATFORM ATTESTATION

FIELD

Embodiments of the invention generally pertain computing devices and more particularly to platform attestation processes.

BACKGROUND

The Trusted Platform Module (TPM) is used for the secure generation and utilization of cryptographic keys. It also enables capabilities such as remote attestation and secure storage of data. In prior art TPM implementations, the host device needs to carry a manufacturer provisioned Endorsement Key (EK) Certificate for use in Attestation Identity Key (AIK) processes. In a discrete TPM implementation, the discrete TPM manufacturer will provision this certificate and store it in the TPM hardware. Prior art discrete TPM implementations could easily store the EK certificate, as they contain sufficient on-chip storage to include the certificate; however for TPM implementations integrated with existing platform hardware, the size of the certificate precludes it from being stored in the existing platform silicon. One of the places where sufficiently large storage is available is on Serial Peripheral Interface (SPI) Flash memory; however, this would require the certificate to be provisioned post-OEM manufacturing, thereby adding manufacturing costs associated with this type of provisioning.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
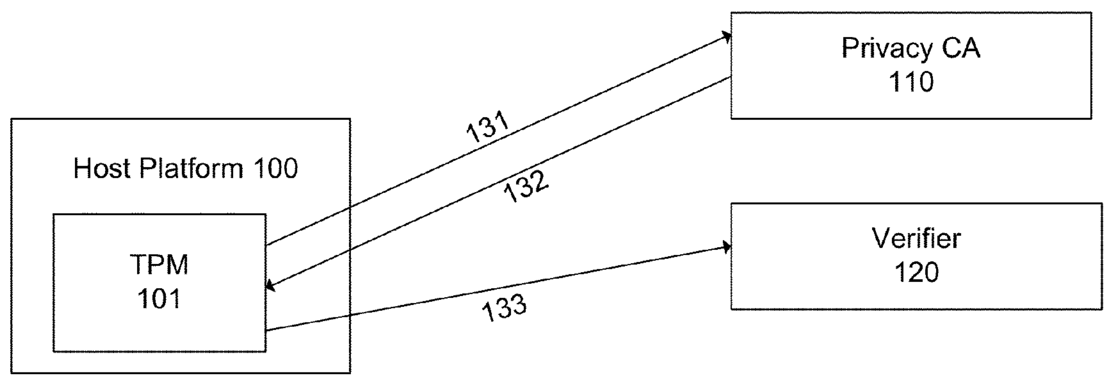
FIG. 1 is a block diagram of system components for performing attestation operations according to an embodiment of the invention.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DESCRIPTION

Embodiments of the invention describe apparatuses, systems and method for Enhanced Privacy ID (EPID) based platform attestation. Embodiments of the invention utilize implementations of Trusted Platform Module (TPM) modules and hardware (for example, TPM implementations consistent with TPM Main Specification 1.2 version 103, published May 15, 2009 by the International Organization for Standardization) and Attestation Identify Key (AIK) processes (for example, AIK processes consistent with TCG Infrastructure Working Group: A CMC Profile for AIK Certificate Enrollment version 1.0 Revision 7, published Mar. 24, 2011 by the Trusted Computing Group).

TPM implementations enable the secure generation and use of cryptographic keys, in addition to provisioning capabilities for remote attestation and sealed storage. As described herein, "remote attestation" is the creation of secure data describing the hardware and software configuration of a host platform (e.g., hash-key summary of host device). Software can utilize a platform TPM implementation to authenticate hardware devices. Each TPM implementation has a private key or credential (e.g., a secret Rivest, Shamir, Adleman (RSA) key) stored by the OEM during production; this private key enables the host to participate in platform authentication processes. For example, said private key may be used to verify that a system seeking access to a resource complies with an expected system configuration.

Because TPM enables attestation processes to utilize on a combination of hardware/software components, it therefore enables protection stronger than a software-only solution. However even where a TPM is used, a key is still vulnerable while a software application that has obtained it from the TPM is using it to perform encryption/decryption operations (e.g., a cold boot attack).

Many attestation procedures use additional security procedures in combination with TPM implementations. For example, platform verification data can be signed using a digital signature which can be authenticated by a verifier. AIKs can be used for this purpose. An AIK is an RSA key pair and may be used as a signature key for signing platform authentication data (e.g., certificates). The private key of said "AIK pair" is used to sign data sent to the verifier who then authenticates the signature by verifying the data using the public key of the AIK pair. The validity of the public AIK key can be ensured by some form of credential trusted by the verifier. For example, the platform may obtain a certificate of the AIK from a Trusted Third Party (TTP) such as a Certification Authority (CA). This certificate may then be sent to the verifier with the public AIK key.

As opposed to utilizing a manufacturer provisioned Endorsement Key (EK) Certificate for AIK processes, embodiments of the invention utilize EPID based data. EPID mitigates the privacy issues of common RSA public key infrastructure (PKI) security implementations where every individual is uniquely identified by their private keys. Instead, EPID provides the capability of remote attestation but only identifies the client computing system as having a component (such as a chipset) from a particular technology generation. EPID is a group signature scheme, where one group's public key corresponds to multiple private keys, and private keys generate a group signature which is verified by the group public key. EPID provides the security property of being anonymous and unlinkable—given two signatures, one cannot determine whether the signatures are generated from one or two private keys. EPID also provides the security property of being unforgeable—without a private key, one cannot create a valid signature.

In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

FIG. 1 is a block diagram of system components performing attestation operations according to an embodiment of the invention. System components include host platform hardware 100, certification authority 110, and verifier 120. Each of said components includes logic/modules for executing attestation process operations described below.

In this embodiment, host platform hardware 100 includes security hardware in the form of TPM implementation 101. Said TPM includes a set of registers for storing platform configuration register (PCR) values which represent aspects of the host platform configuration for use in attestation processes. For example, a user of the host platform may attempt to access a web service provided by a server running on verifier 120. In order to access this service, the configuration of the host platform represented by said PCR values is attested to the satisfaction of the verifier; CA 110 represents a TTP in this scenario—i.e. an entity which is trusted by both the user and the verifier.

Attestation processes according to embodiments of the invention involve host platform 100 sending a private key to CA 110 and data that indicates the configuration of the platform (such as said PCR values), shown as transmission 131. CA 110 verifies that the private key is associated with the platform configuration data (i.e., the platform is configured in a manner consistent with a device that would have possession of the private key) and transmits a signed AIK certificate to host platform 100 (shown as transmission 132). Thus, when host platform 100 needs to be verified, it sends this signed AIK certificate to verifier 120 (shown as transmission 133). The verifier can use, for example, a public key to verify the validity of the signed certificate.

As opposed to prior art solutions using an EK certificate for attestation processes, embodiments of the invention utilize an EPID process for AIK verification procedures. The use of an EK certificate as a private key is a scalable approach, as device manufacturers can issue a unique private device key to each manufactured device; however, issuing a private key specific and unique to a device raises a privacy concern, because the device certificate is used to uniquely identify the device. Using EPID, host platform logic 100 may prove to verifier 120 that it is a valid device (i.e., certified by a hardware manufacturer) without revealing its identity and without the verifier being able to link multiple authentication attempts made by the device.

Figure 2A:
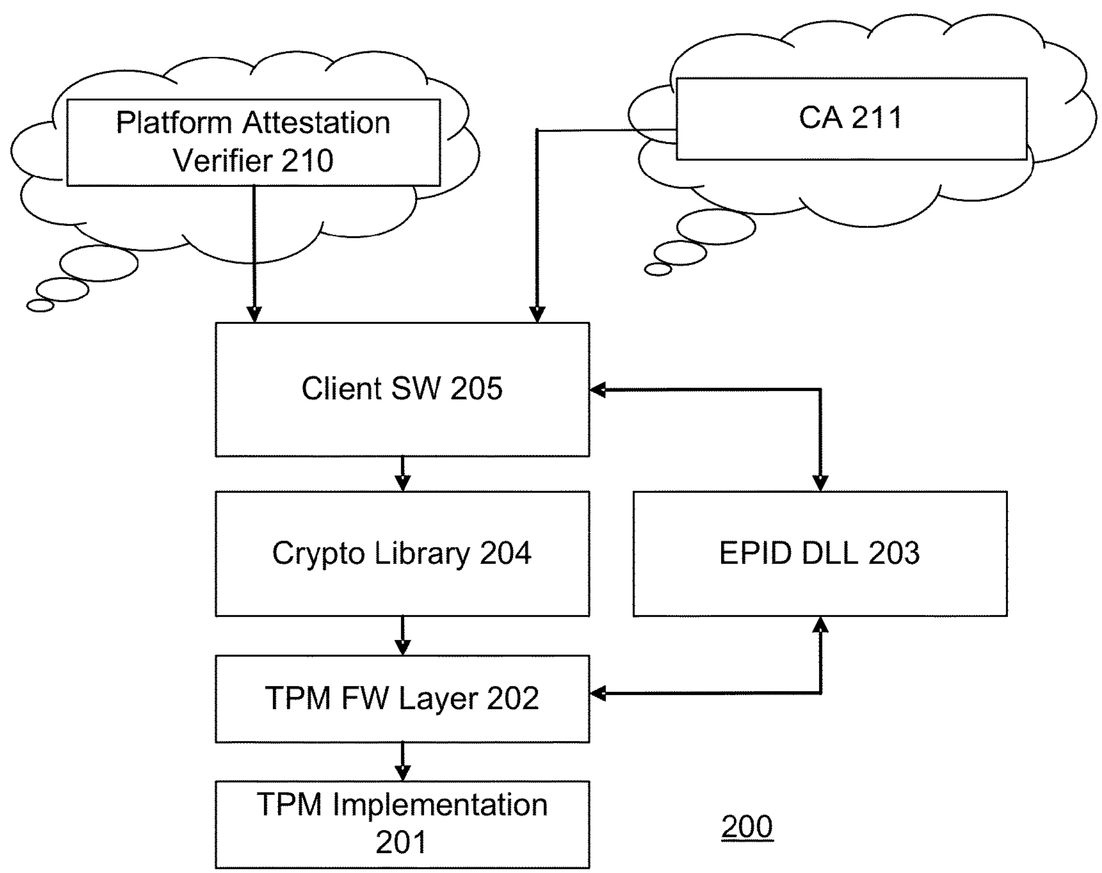
FIG. 2A-FIG. 2B are diagrams of attestation logic and modules according to an embodiment of the invention.

FIG. 2A is a block diagram of attestation logic and modules according to an embodiment of the invention. In this embodiment, system 200 utilizes an EPID process for attestation operations. An EPID process can be described as a special digital signature scheme. As described above, unlike prior art schemes, one public key in an EPID scheme corresponds to multiple private keys. In this embodiment there are three types of entities in an EPID scheme: issuer, members, and verifiers. The issuer is the hardware manufacturer of the host platform, the member is a hardware device made by the manufacturer, and the verifier may be software on the host platform, a server device communicatively coupled to the host, or any another hardware device.

The issuer creates an EPID public key and issues one or more EPID private keys to each member. It is possible for multiple devices to be issued the same private key. Each member can use this private key to digitally sign a message, and the resulting signature is called an EPID signature. The verifier can use the public key to verify the correctness of a signature—i.e., to verify that the EPID signature was indeed created by a member in good standing with a valid private key. The EPID signature, however, does not reveal any information about which private key was used to create the signature.

In this embodiment, TPM implementation 201 includes the above described EPID Private Key and basic hardware support. In some embodiments, TPM implementation 201 is an integrated hardware implementation (e.g., Platform Trust Technology (PTT)). In some embodiments, this basic hardware support does not involve additional hardware for the host platform, and is limited to firmware modules/components.

TPM firmware layer 202 includes baseline TPM firmware as well as modules to support additional commands for AIK support as described below. EPID Dynamic Link Library (DLL) 203 is a software component to manage the EPID public key, certificate and the private key handle. Cryptography Library 204 is an OS-specific implementation of encryption libraries and EPID extensions. Some modifications in the OS cryptography library functions (e.g., Bcrypt/NCrypt) may be made to comprehend EPID support. These extensions can be integrated inside the OS or can be provided by extensions to the cryptography library modules. Client software 205 is a module to provide platform attestation services. For example, client software 205 may comprise an anti-malware SW for providing platform attestation services to a server interested in verifying the platform health.

In this embodiment, platform attestation verifier 210 is a server responsible for verifying TPM credentials (e.g., TPM_Quotes, as described below) signed using EPID based AIK. AIK Certificate Generation CA 211 is a Certificate Authority responsible for generating an AIK certificate.

Figure 2B:
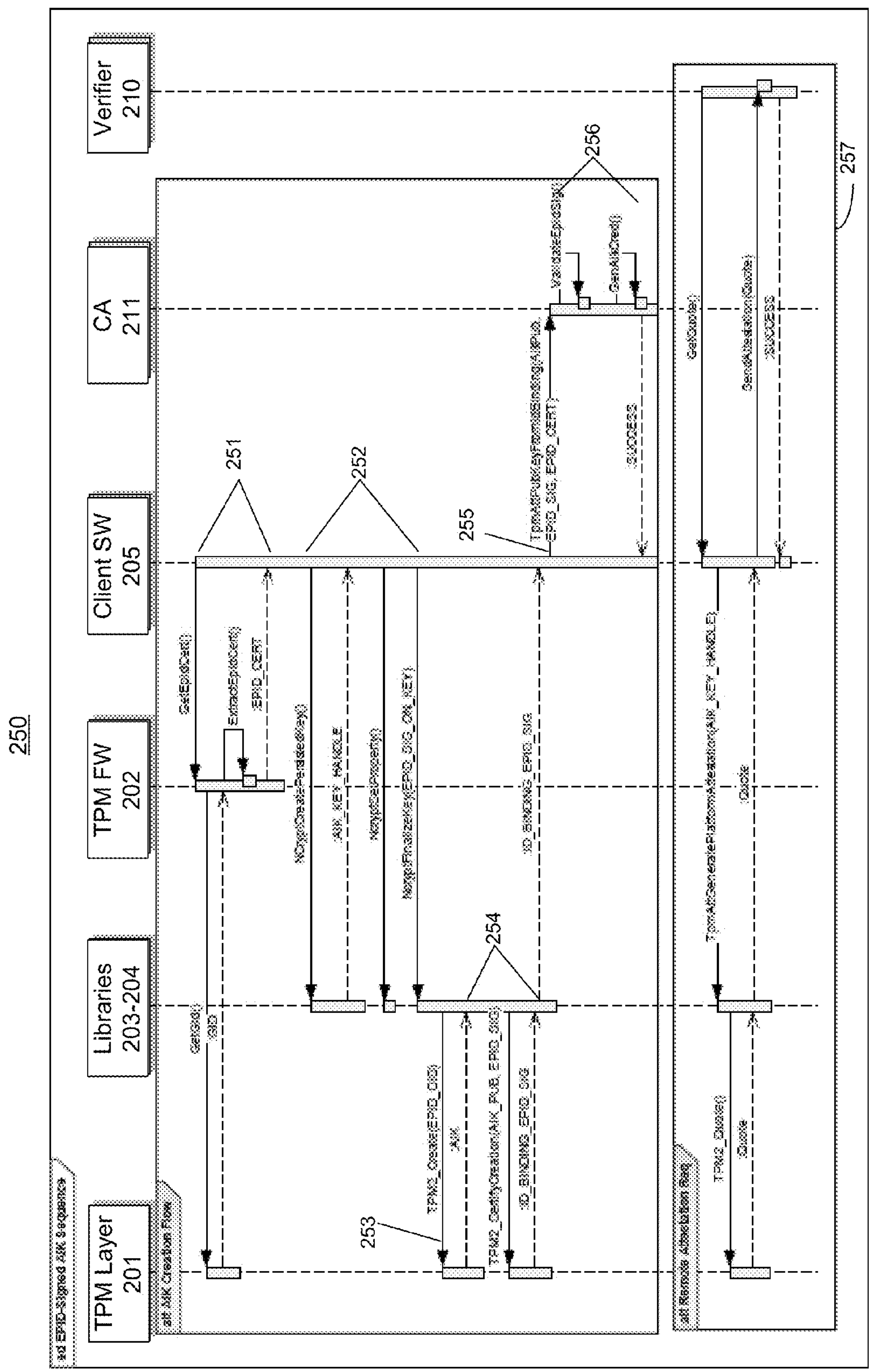

FIG. 2B illustrates a platform attestation process flow by the above described components/modules according to an embodiment of the invention. Diagram 250 illustrates a process initiated by client software 205 when it determines it needs a new EPID-signed AIK from the host platform TPM implementation. Operations 251 show client software 205 requesting an EPID certificate from TPM layer 201 by accessing TPM firmware layer 202. Once client software 205 receives said EPID certificate, it requests a new AIK from the OS, shown as operations 252.

Operations 252 are shown to involve interactions between client software 205 and Cryptography/EPID libraries 203-204. In this example, cryptography libraries 203 comprise an implementation of the Windows CreatePersistantKey API: the NCryptCreatePersistedKey function is a Cryptography API: Next Generation (CNG) instruction for initiating the creation of a new RSA key pair; NCryptSetProperty is an instruction for exchanging documents in a secure environment; and NCryptFinalizeKey creates and stores a new key pair. In this embodiment, EPID DLL 204 is utilized to extend the functionality of the Windows CreatePersistantKey API to support EPID operations.

During this key creation process, a TPM2_CREATE command is sent from OS Library 203 to TPM implementation 201. The TPM layer infers from the object ID (OID) sent with the command that an EPID-SIGNED AIK is requested. TPM layer 201 and cryptography/EPID libraries 203-204 create and sign an AIK with the EPID key, returning this to client software 205 (shown as operations 254).

Client software 205 returns the AIK public key, the signed AIK and EPID certificate to remote CA 211 (shown as operation 255). CA 211 then generates an attestation certificate after validating the EPID signed AIK certificate and issues the appropriate credentials to client software 205 (shown as operations 256).

As described above, Platform Attestation Verifier 210 is a server responsible for verifying the platform health. Verifier 210 verifies that TPM credentials have been signed using EPID based AIK (e.g., a request for a TPM quote), shown as operations 257. In this example, verifier 210 issues a GetQuote request to client software 205, which is forwarded to cryptography/EPID libraries 203-204 as a platform attestation request, and as a TPM2_Quote request to TPM layer 201. A valid quote is then forwarded to verifier 210.

Figure 3:
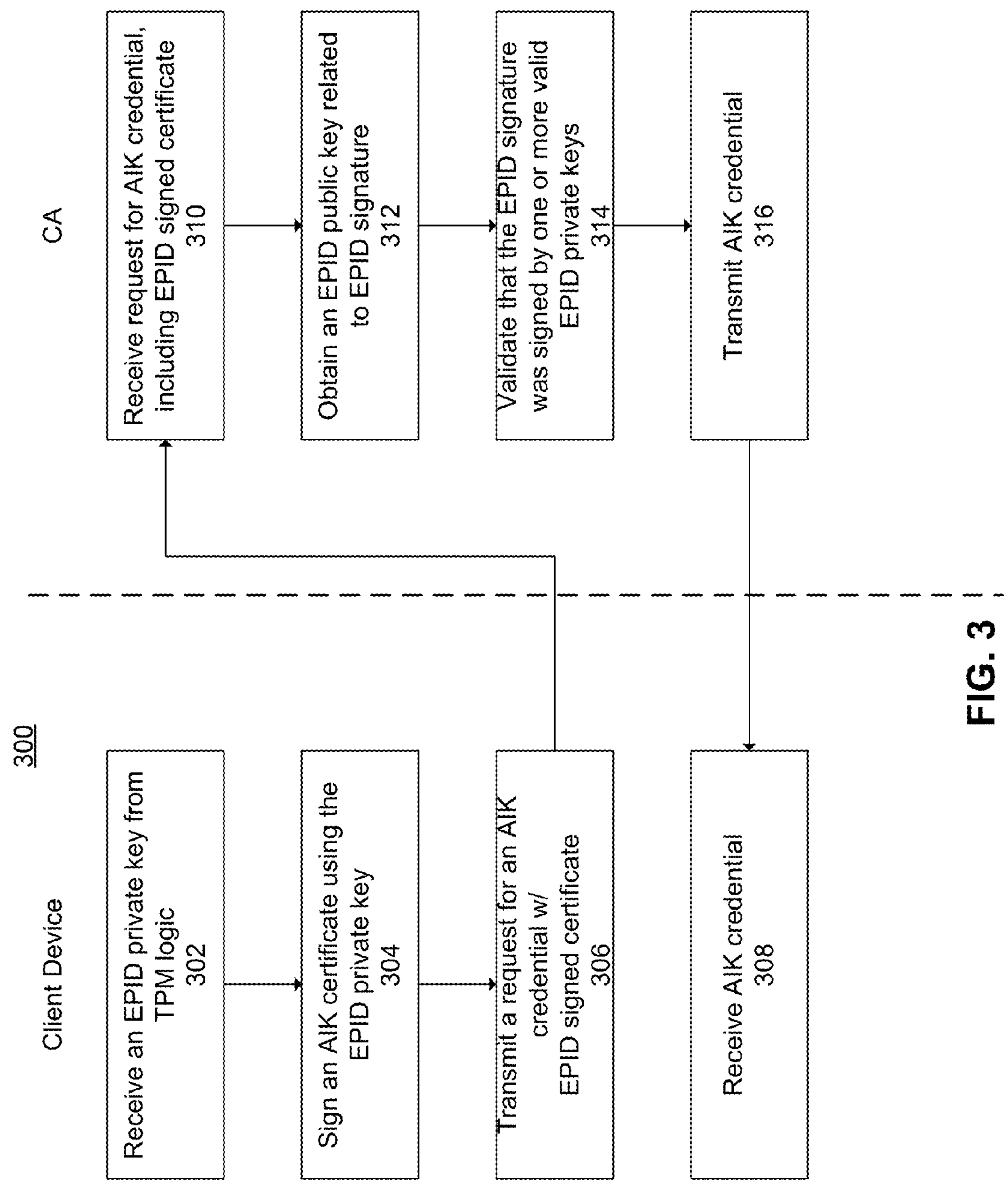
FIG. 3 is a flow diagram of an EPID-based attestation process according an embodiment of the invention.

FIG. 3 is a flow diagram of an EPID-based attestation process according an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 300 includes operations to initiate an attestation process for a client device (i.e., host platform of the client device) by retrieving an EPID private key from a TPM implementation, 302. An AIK certificate is then signed via an EPID process using the EPID private key, 304. A request for an AIK is transmitted with an AIK credential to a CA, 306. As described above, in some embodiments said request may also include an EPID certificate and an EPID public key related to said EPID private key.

Said CA receives the request for the AIK credential including the EPID signed AIK certificate, 310, and obtains the related EPID public key, 312 (if said public key was not transmitted along with said request). Upon validating that the EPID signature was signed by one or more valid EPID private keys, 314, an AIK credential is transmitted to the client device, 316. When the client device receives said AIK credential, 308, it may proceed to be validated by a verifier.

Attestation processes utilizing EPID, such as process 300, mitigate the privacy issues of common RSA PKI security implementations where every individual is uniquely identified by their private keys. Instead, EPID provides the capability of remote attestation but only identifies the client computing system as having a component (such as a chipset) from a particular technology generation. EPID is a group signature scheme, where one group's public key corresponds to multiple private keys, and private keys generate a group signature which is verified by the group public key. EPID provides the security property of being anonymous and unlinkable—given two signatures, one cannot determine whether the signatures are generated from one or two private keys.

Figure 4:
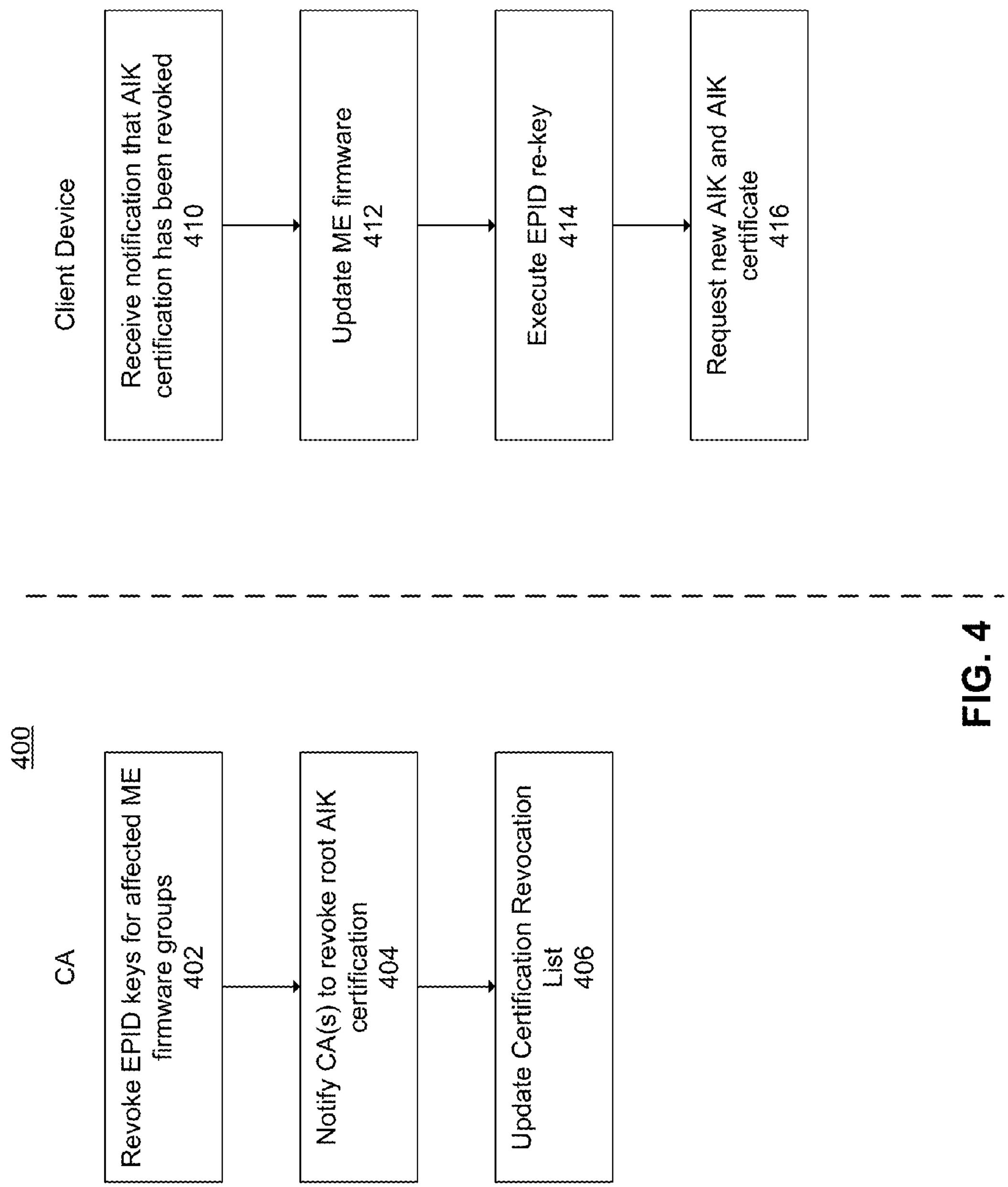
FIG. 4 is a flow diagram of a process for a revocation process of EPID data according an embodiment of the invention.

FIG. 4 is a flow diagram of a process for revocation process of EPID data according an embodiment of the invention. The above described AIK credential from process 300 of FIG. 3 may need to be revoked, for example, because of an exploited Management Engine (ME) firmware vulnerability. Process 400 include operations for revoking the EPID keys for all affected ME EPID groups, 402. In some embodiments, the respective Certification Authorities are notified to revoke the AIK root certification that was associated with the exploitable ME firmware, 404 (thereby eliminating operation to revoke individual private keys).

The CA subsequently issues a Certification Revocation List (CRL) update to its CRL distribution servers, 406. Said CRL may include a list of certificates that are "revoked" (i.e., irreversibly revoked) or on "hold" (i.e., reversibly revoked) that are periodically downloaded by Certification Authorities.

Thus, in some embodiments, a subsequent attempt to use said AIK credential, the client SW on the host platform would be notified the AIK has been revoked, 410. This would trigger a firmware update to fix the vulnerability, 412. Subsequent to the firmware update, an EPID re-key may occur, 414 and with it a request for a new AIK and AIK cert, 416.

Thus, embodiments of the invention significantly improve the resilience of host platforms to malicious attacks, eliminating, for example, the possibility of a rogue software agent launching a man-in-the-middle attack to provide platform attestation services to a verifier based on a fake AIK and a fake AIK certificate.

Figure 5:
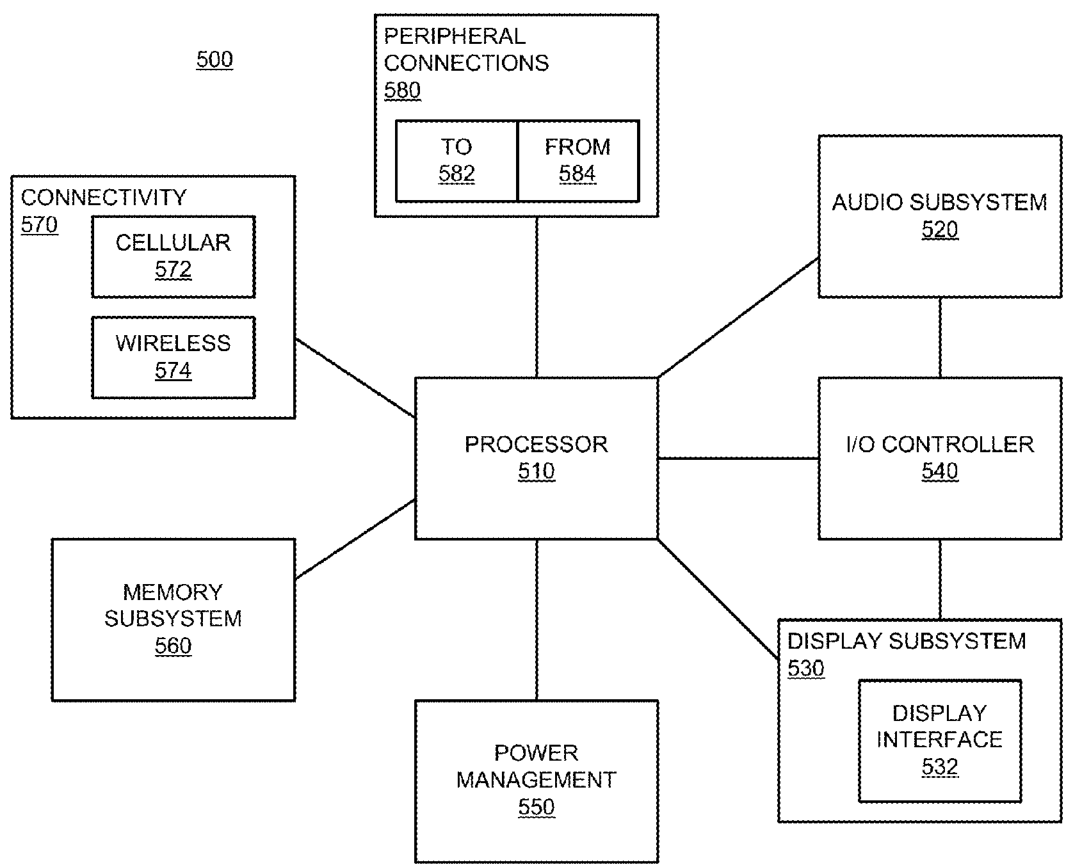
FIG. 5 is a block diagram of a client device for utilizing an EPID-based attestation process according to an embodiment of the invention.

FIG. 5 is a block diagram of a client device for utilizing an EPID-based attestation process according to an embodiment of the invention. Computing device 500 represents a mobile computing device, such as a computing tablet, a mobile phone or smartphone, a wireless-enabled e-reader, or other wireless mobile device. It will be understood that certain of the components are shown generally, and not all components of such a device are shown in device 500.

Device 500 includes processor 510, which performs the primary processing operations of device 500. Processor 510 can include one or more physical devices, such as microprocessors, application processors, microcontrollers, programmable logic devices, processor cores, or other processing means. The processing operations performed by processor 510 include the execution of an operating platform or operating system on which applications and/or device functions are executed. The processing operations include operations related to I/O (input/output) with a human user or with other devices, operations related to power management, and/or operations related to connecting device 500 to another device. The processing operations may also include operations related to audio I/O and/or display I/O.

In one embodiment, device 500 includes audio subsystem 520, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 500, or connected to device 500. In one embodiment, a user interacts with device 500 by providing audio commands that are received and processed by processor 510.

Display subsystem 530 represents hardware (e.g., display devices) and software (e.g., drivers) components that provide a visual and/or tactile display for a user to interact with the computing device. Display subsystem 530 includes display interface 532, which includes the particular screen or hardware device used to provide a display to a user. In one embodiment, display interface 532 includes logic separate from processor 510 to perform at least some processing related to the display. In one embodiment, display subsystem 530 includes a touchscreen device that provides both output and input to a user.

I/O controller 540 represents hardware devices and software components related to interaction with a user. I/O controller 540 can operate to manage hardware that is part of audio subsystem 520 and/or display subsystem 530. Additionally, I/O controller 540 illustrates a connection point for additional devices that connect to device 500 through which a user might interact with the system. For example, devices that can be attached to device 500 might include microphone devices, speaker or stereo systems, video systems or other display device, keyboard or keypad devices, or other I/O devices for use with specific applications such as card readers or other devices.

As mentioned above, I/O controller 540 can interact with audio subsystem 520 and/or display subsystem 530. For example, input through a microphone or other audio device can provide input or commands for one or more applications or functions of device 500. Additionally, audio output can be provided instead of or in addition to display output. In another example, if display subsystem includes a touchscreen, the display device also acts as an input device, which can be at least partially managed by I/O controller 540. There can also be additional buttons or switches on device 500 to provide I/O functions managed by I/O controller 540.

In one embodiment, I/O controller 540 manages devices such as accelerometers, cameras, light sensors or other environmental sensors, or other hardware that can be included in device 500. The input can be part of direct user interaction, as well as providing environmental input to the system to influence its operations (such as filtering for noise, adjusting displays for brightness detection, applying a flash for a camera, or other features). In one embodiment, device 500 includes power management 550 that manages battery power usage, charging of the battery, and features related to power saving operation.

Memory subsystem 560 includes memory devices for storing information in device 500. Memory can include nonvolatile (state does not change if power to the memory device is interrupted) and/or volatile (state is indeterminate if power to the memory device is interrupted) memory devices. Memory 560 can store application data, user data, music, photos, documents, or other data, as well as system data (whether long-term or temporary) related to the execution of the applications and functions of system 500.

Connectivity 570 includes hardware devices (e.g., wireless and/or wired connectors and communication hardware) and software components (e.g., drivers, protocol stacks) to enable device 500 to communicate with external devices. The device could be separate devices, such as other computing devices, wireless access points or base stations, as well as peripherals such as headsets, printers, or other devices.

Connectivity 570 can include multiple different types of connectivity. To generalize, device 500 is illustrated with cellular connectivity 572 and wireless connectivity 574. Cellular connectivity 572 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 574 refers to wireless connectivity that is not cellular, and can include personal area networks (such as Bluetooth), local area networks (such as Wi-Fi), and/or wide area networks (such as Wi-Max), or other wireless communication.

Peripheral connections 580 include hardware interfaces and connectors for implementing low power control logic as described above, as well as software components (e.g., drivers, protocol stacks) to make peripheral connections. It will be understood that device 500 could both be a peripheral device ("to" 582) to other computing devices, as well as have peripheral devices ("from" 584) connected to it. Device 500 commonly has a "docking" connector to connect to other computing devices for purposes such as managing (e.g., downloading and/or uploading, changing, synchronizing) content on device 500. Additionally, a docking connector can allow device 500 to connect to certain peripherals that allow device 500 to control content output, for example, to audiovisual or other systems.

In addition to a proprietary docking connector or other proprietary connection hardware, device 500 can make peripheral connections 580 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

As described above, TPM implementations for supporting EPID-based attestation processes include logic separate from or integrated with the above described components of device 500 (e.g., processor 510), and modules included in memory subsystem 560 or other separate non-volatile storage.

Embodiments of the invention thus describe a client device comprising a memory, a processor, Trusted Platform Management (TPM) logic, and a client module. Said client module is to receive an Enhanced Privacy ID (EPID) private key from the TPM logic, sign an Attestation Identification Key (AIK) certificate via an EPID process using the EPID private key, transmit a request for an AIK credential, the request to include the AIK certificate signed via the EPID process to a certification authority (CA) included in a server device communicatively coupled with the client device, and receive an AIK credential from the CA. Said client device may further include an antenna, and radio frequency circuitry coupled to the antenna to receive signal data to be processed by the system.

In some embodiments, said client module comprises anti-malware software. In some embodiments, said TPM logic is integrated with the processor. And in some embodiments, said request for the AIK credential includes platform hardware information obtained from one or more platform configuration registers (PCRs).

The above described client module may further sign the AIK certificate using a plurality of EPID private keys. In some embodiments, said request for the AIK credential includes an EPID public key related to the EPID private key.

Embodiments of the invention describe methods having operations including receiving an Enhanced Privacy ID (EPID) private key from Trusted Platform Management (TPM) logic, signing an Attestation Identification Key (AIK) certificate via an EPID process using the EPID private key, transmitting a request for an AIK credential, the request to include the AIK certificate signed via the EPID process to a certification authority (CA) included in a server device communicatively coupled with the client device, and receiving an AIK credential from the CA.

In some embodiments, methods include operations for utilizing the AIK credential in an anti-malware process. In some embodiments, methods include operations for signing the AIK certificate using a plurality of EPID private keys. The request for the AIK credential may include an EPID public key related to the EPID private key. Said request for the AIK credential may also include platform hardware information obtained from one or more platform configuration registers (PCRs).

Embodiments of the invention describe server devices having a memory, a processor core, and a certification authority, stored in the memory and executed via the processor core. Said certification authority is to receive a request from a client device for an Attestation Identification Key (AIK) credential, the request to include an AIK certificate, and an Enhanced Privacy ID (EPID) signature, obtain an EPID public key related to the EPID signature, validate, using the EPID public key, that the EPID signature was signed by one or more valid EPID private keys, and in response to validating the EPID signature, transmit an AIK credential to the client device.

In some embodiments, said received request for the AIK credential includes one or more platform configuration register (PCR) values. In some embodiments, said received request for the AIK credential includes an EPID public key related to the EPID private key. Said AIK credential transmitted to the client device may also include the EPID public key.

Various components referred to above as processes, servers, or tools described herein may be a means for performing the functions described. Each component described herein includes software or hardware, or a combination of these. Each and all components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A system comprising:

a memory;

a processor;

Trusted Platform Management (TPM) logic;

a client module stored in the memory and executed via the processor to:

receive an Enhanced Privacy ID (EPID) private key from the TPM logic;

sign an Attestation Identification Key (AIK) certificate via an EPID process using the EPID private key;

transmit a request for an AIK credential, the request to include the AIK certificate signed via the EPID process, to a certification authority (CA) included in a server device communicatively coupled with the client module for the CA to validate, using an EPID public key, that the EPID signature was signed by one or more valid EPID private keys; and receive an AIK credential from the CA included in the server device;

an antenna; and radio frequency circuitry coupled to the antenna to receive signal data to be processed by the system.

2. The system of claim 1, wherein the client module comprises anti-malware software.

3. The system of claim 1, wherein the TPM logic is integrated with the processor.

4. The system of claim 1, the client module to further sign the AIK certificate using a plurality of EPID private keys.

5. The system of claim 1, wherein the request for the AIK credential includes the EPID public key related to the EPID private key.

6. The system of claim 1, wherein the request for the AIK credential includes platform hardware information obtained from one or more platform configuration registers (PCRs).

7. A method comprising:

receiving an Enhanced Privacy ID (EPID) private key from Trusted Platform Management (TPM) logic included in a client device;

signing an Attestation Identification Key (AIK) certificate via an EPID process using the EPID private key;

transmitting a request for an AIK credential, the request to include the AIK certificate signed via the EPID process using the EPID private key from the TPM logic to a certification authority (CA) included in a server device communicatively coupled with the client device for the CA to validate, using an EPID public key, that the EPID signature was signed by one or more valid EPID private keys; and receiving an AIK credential from the CA included in the server device.

8. The method of claim 7, further comprising:

utilizing the AIK credential in an anti-malware process.

9. The method of claim 7, further comprising:

signing the AIK certificate using a plurality of EPID private keys.

10. The method of claim 7, wherein the request for the AIK credential includes the EPID public key related to the EPID private key.

11. The method of claim 7, wherein the request for the AIK credential includes platform hardware information obtained from one or more platform configuration registers (PCRs).

12. A server device comprising:

a memory;

a processor core; and a certification authority (CA), stored in the memory and executed via the processor core, to:

receive a request from a client device for an Attestation Identification Key (AIK) credential, the request to include an AIK certificate signed with an Enhanced Privacy ID (EPID) process using an EPID private key from a Trusted Platform Management (TPM) logic;

obtain an EPID public key related to the EPID signature;

validate, using the EPID public key, that the EPID signature was signed by one or more valid EPID private keys; and in response to validating the EPID signature, transmit an AIK credential from the (CA) to the client device.

13. The server device of claim 12, wherein the received request for the AIK credential includes an EPID public key related to the EPID private key.

14. The server device of claim 12, wherein the received request for the AIK credential includes one or more platform configuration register (PCR) values.

15. The server device of claim 12, wherein the AIK credential transmitted to the client device includes the EPID public key.

* * * * *